United States Patent [19]
Metcalf et al.

[11] Patent Number: 4,601,935
[45] Date of Patent: Jul. 22, 1986

[54] EPDM LAMINATE

[75] Inventors: Fredric D. Metcalf, Rootstown; John G. Sommer, Hudson, both of Ohio

[73] Assignee: GenCorp Inc., Akron, Ohio

[21] Appl. No.: 730,910

[22] Filed: May 6, 1985

[51] Int. Cl.[4] .................. B32B 3/08; B32B 27/08
[52] U.S. Cl. ..................... 428/57; 428/141; 428/147; 428/474.7; 428/519
[58] Field of Search .............. 428/147, 141, 519, 57, 428/474.7

[56] References Cited

U.S. PATENT DOCUMENTS 4,113,799  9/1978  Van Ornum et al.
4,461,875  7/1984  Crepeau ................ 428/141 X
4,551,392  11/1985  Draexler ............... 428/519 X

FOREIGN PATENT DOCUMENTS 2082191  3/1982  United Kingdom ........... 428/519

OTHER PUBLICATIONS

A. Damusis, "Sealants", Reinhold Publishing Corp., N.Y., 1967, pp. 307-310.
F. C. Jagisch, Adhesive Age, Nov. 1978, pp. 47-50.
I. Skeist, Handbook of Adhesives by Reinhold Publishing Corp., N.Y. 8-1962, pp. 221-228.

Primary Examiner—Thomas J. Herbert

[57] ABSTRACT

Cured rubbery carbon black reinforced EPDM roofing membranes are joined at their primed seams by a seaming tape comprising a carbon black reinforced compounded lightly cured blend of a butyl rubber and a polyisobutylene. The tape can exhibit a peel strength of at least about 2.5 pli at about 158° F.

5 Claims, 2 Drawing Figures

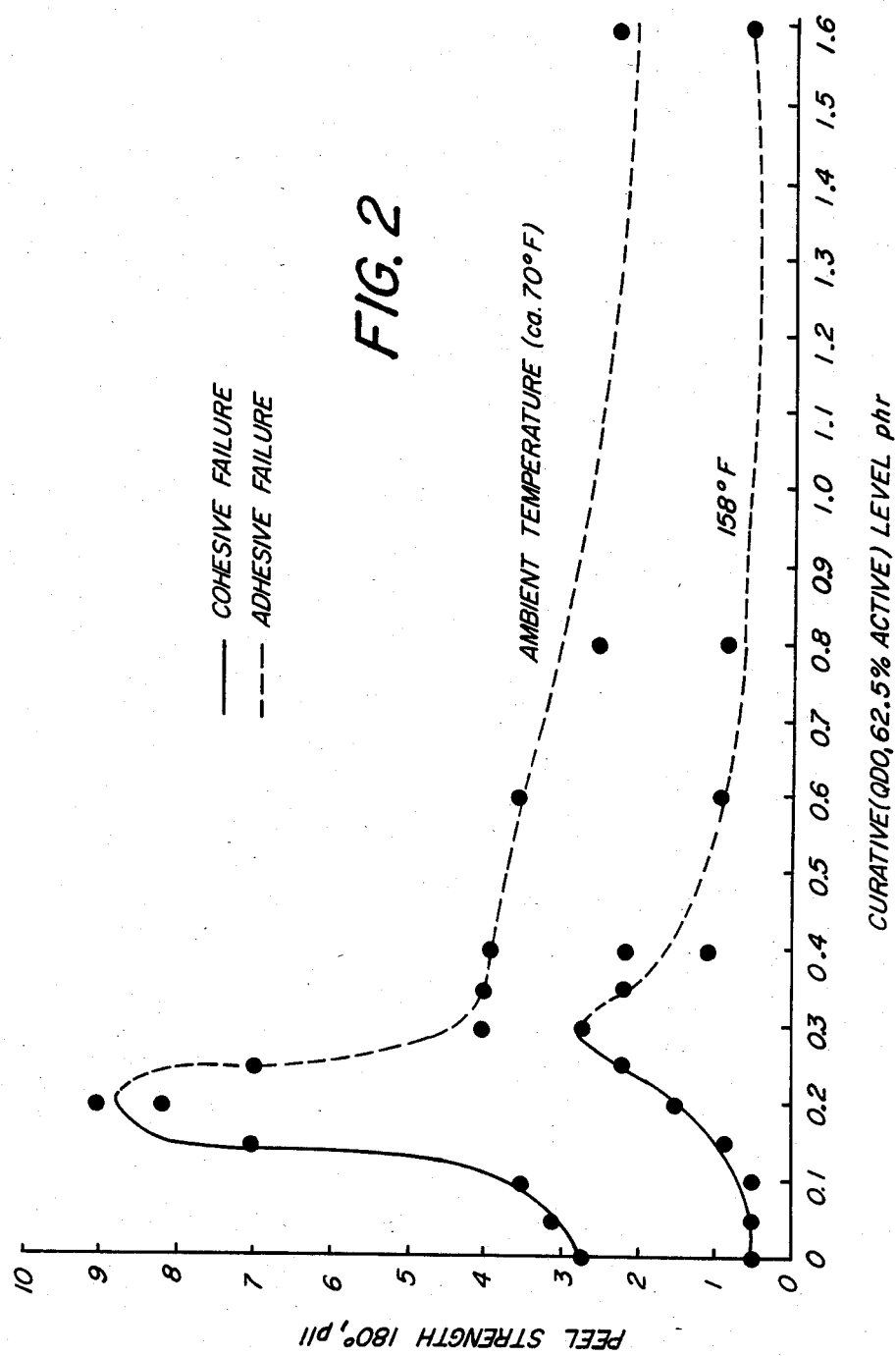

EPDM LAMINATE

This invention relates to a seaming tape for joining EPDM single-ply roofing materials.

BACKGROUND OF THE INVENTION

Single-ply roofing (SPR) membrane made from ethylenepropylene-non-conjugated diene rubbery terpolymer (EPDM) is manufactured in large sheets. These sheets can be from 7 to 40 or more feet wide and 100 or more feet long. During installation, these sheets must be connected at their edges into a watertight seam.

Traditionally, the seams for EPDM SPR are made using a polychloroprene contact adhesive in a simple lap seam. The area to be overlapped, 2 or 3 inches, is washed usually with a solvent such as white gas. Then the contact adhesive is applied to both surfaces before the seam is formed. After the seam bond is formed, a "lap sealant" is applied to the overlapped edge. This "lap sealant" protects the adhesive from oxygen, ozone, ultraviolet radiation, water and other elements.

Seaming SPR membrane by the above method has disadvantages. The solvent is flammable and its fumes are obnoxious. If the lap sealant is torn away exposing the adhesive, the seam is likely to leak eventually.

In addition to these problems of installation, the peel strength of the contact adhesive which is normally used is considered low. It is usually only about 2 pli (pounds per linear inch) at RT and 1.5 pli at 158° F.

Because of the problems of installation and the inherently low peel strength achieved with polychloroprene adhesives, alternative adhesive methods have been sought. One of these is the use of seaming tapes. Seaming tapes are sticky strips of caulk-like adhesive usually 2–3 inches wide and nominally 0.040 inch thick. They are placed between the overlapped layers of the roofing membranes. Two general types have been introduced or experimented with: non-curable and roof-curable.

Non-curable tapes contain no cure system. They are manufactured, shipped, installed and remain in service indefinitely in the uncured state. Roof-curable tapes contain a curative system, but are not intended to crosslink until after installation.

Both types of tape (non-curable and roof-curable) have advantages, but also disadvantages.

Non-curable tapes are easy to manufacture, ship, store and install because there is no worry about precuring (scorch) before installation. However, since they never cure, even after installation, peel strength never increases with time. Therefore, peel strength, especially at temperatures of 160°–180° F. (realistic roof-top temperatures) is usually extremely low, in the range of 0.5 pli or less.

Roof-curable tapes must be carefully manufactured, shipped, stored and installed to insure that they do not cure before installation. Precure can make a roof-curable tape less sticky than desired, even to the point of being nonserviceable. It is difficult to avoid precure, especially since the tape is designed to cure at ambient roof-top temperatures in a reasonably short period of time. This requires a low temperature cure system, which greatly aggravates the problems of precure or scorch. Even if properly installed, roof-curable tape has low initial peel strength, no better than non-curable tapes. This could be a problem, particularly for hot-weather installations. During hot weather, roof-top temperatures can reach 160°–180° F. At these temperatures, the initial peel strength of the uncured roof-curable tape can easily be 0.5 pli or less.

An object of the present invention is to provide a laminate of two EPDM roofing membranes joined at their seams with a seaming tape which overcomes the above difficulties.

BRIEF DESCRIPTION OF THE DRAWINGS

These and other objects and advantages of the present invention will become more apparent to those skilled in the art from the following description, example and drawings wherein FIG. 1 is a vertical cross-sectional view of two single-ply EPDM roofing membranes joined by a seaming tape and FIG. 2 is a graph showing the relationship of the level of curative to the peel strength of the seaming tape.

SUMMARY OF THE INVENTION

Figure 1:
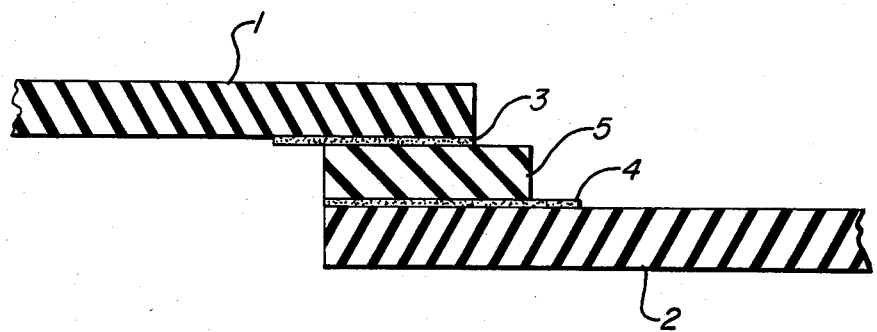

According to the present invention there is provided a laminate of two cured carbon black reinforced EPDM laminates joined at their seams by a lightly crosslinked tacky carbon black reinforced seaming tape compound comprising a blend of butyl rubber and polyisobutylene. By lightly crosslinked is meant that the amount of curing agent employed is less than that which would be required to fully cure the butyl rubber in the blend. Thus, the present invention provides a formulation and method for making seaming tape that is lightly precrosslinked during manufacture.

Light precrosslinking results in several prounced advantages compared to either non-curable or roof-curable tape. Since it is only lightly crosslinked during manufacture, there is not any worry about changing properties during shipping, storage or installation. Unlike either non-curable or roof-curable tapes, full adhesive strength is developed virtually as soon as it is installed, e.g., as soon as the tape fully wets the roofing membrane surfaces, a strong joint is formed.

A major advantage of lightly precrosslinked tape is high peel strength at both ambient (ca 70° F.) and elevated temperature as described below.

For example considering other roofing membranes using sealing tapes the following general conclusions may be reached:

| Type of Sealing Tape | Scorch | Peel Strength at 158° F. Initial | Peel Strength at 158° F. Final |
| --- | --- | --- | --- |
| Tape non-cured | No problem | Low | Low |
| Tape fully curable in time after application (roof curable) | Problem | Low | High |
| Tape lightly cured to low crosslink density according to the present invention | No problem | High | High |

In FIG. 1 of the drawing there are shown carbon black reinforced cured rubbery EPDM membranes 1 and 2. Each membrane contains primer 3 and 4 deposited from solution and dried on the seam areas or edges. Seaming tape 5 of a lightly cured tacky butyl rubber-polyisobutylene compound serves to adhere EPDM membranes 1 and 2 to each other at their seam.

DISCUSSION OF DETAILS AND PREFERRED EMBODIMENTS

Ethylene-propylene-non-conjugated diene rubbery terpolymers (EPDMs) are well-known. They are made by the copolymerization of ethylene, propylene and a non-conjugated diene such as 1,4-hexadiene (preferred), ethylidene norbornene or dicyclopentadiene. They may be crystalline or non-crystalline. Their relative unsaturation can vary from about 0.7 to 4.5 The mole % of ethylene can vary from about 62 to 85 and the raw (uncured and uncompounded) Mooney viscosity (ML 1+8 at 250° F.) can vary from about 14 to 84. These EPDM polymers are compounded with reinforcing carbon blacks (preferred are furnace blacks) and sulfur cured. They, also, may contain fillers like clays and rubber extender oils such as petroleum oils. Rubbery or elastomeric EPDM terpolymers, methods for making them and methods for curing them are known as shown by "Rubber Chemistry and Technology," Volume 45, No. 1, March, 1972, Division of Rubber Chemistry, Inc., American Chemical Society, pages 709 to 881; "Rubber Technology," 2nd Ed., Morton, Van Nostrand Reinhold Company, New York, 1973, Chapter 9; "Polymer Chemistry of Synthetic Elastomers," Part II, High Polymers Series, Vol. 23, John Wiley & Sons Inc., New York, 1969, Chapter 7; "Encyclopedia Of Polymer Science and Technology," Interscience Publishers a division of John Wiley & Sons, Inc., New York, Vol. 6 (1967) pages 367-8 and Vol. 5 (1966) page 414; "Encyclopedia Of Chemical Technology," Kirk-Othmer, Interscience publishers Div. of John Wiley & Sons, Inc., New York, 2nd Ed. (1965) Vol. 17, pages 575–576 and 2nd Ed. (1965) Vol. 7, pages 686 to 693 and "Synthetic Rubber Manual," International Institute of Synthetic Rubber Producers, Inc., 8th Ed., 1980.

Butyl rubber is well-known and is made by the copolymerization of isobutylene and isoprene. It can have an unsaturation of from about 0.6 to 2.5 mol %, preferably about 1.5 mol %, and a raw Mooney viscosity ML 1+8 at 212° F. of from about 18 to 75, preferably from about 40 to 60. Brominated butyl and chlorinated butyl, also, may be used; the butyl may contain from about 1 to 1.5 weight % of bromine or chlorine. Mixtures of butyl rubber, brominated butyl rubber and chlorinated butyl rubber may be used. Butyl rubbers are well-known as shown by "Encyclopedian of Polymer Science And Technology," Vol. 2, John Wiley & Sons, Inc., 1965; "Synthetic Rubber," Whitby et al, John Wiley & Sons, Inc., New York, 1954; "Vinyl and Related Polymers," Schildknecht, John Wiley & Sons, Inc., New York, 1952 and "Blue Book 1982," Materials, Compounding Ingredients and Machinery for Rubber, 1982, Bill Communications, Inc., New York.

Polyisobutylenes are well-known. They can range from tacky viscous solids to rubber-like materials. In the practice of the present invention there are used polyisobutylenes having an average $\overline{M}v \times 10^4$ of from about 0.60 to 1.40 (viscosity-average molecular weight in the relation $[\eta] = 3.6 \times 10^{-4}$ M (diisobutylene solvent at $-20°$ C.)). Polyisobutylenes are shown by the "Encyclopedia of Polymer Science And Technology," Vol. 2, John Wiley & Sons, Inc. 1965; "Synthetic Rubber," Whitby et al, John Wiley & Sons, Inc., New York, 1954 and "Vinyl and Related Polymers," Schildknecht, John Wiley & Sons, Inc., New York, 1952.

The butyl rubber and polyisobutylene blend contains carbon black, plasticizers, pigments and a low temperature curing system such as a quinoid curing system including p-quinone dioxime with lead dioxide plus zinc oxide and stearic acid. Other quinoid type or quinoid developing curing agents may be used such as dibenzoyl-p-quinone dioxime, p-dinitrosobenzene and N-methyl-N,4-dinitrosoaniline. Other activators can be used such as the organic and inorganic peroxides. A minor but sufficient amount of the curing system is used to obtain only light crosslinking of the seaming tape compound, a low crosslink density compound. In other words the crosslink density is less than that which would be obtained using an optimum amount of the curing agent or system in order to obtain a high modulus rubber. In the present invention sufficient of the curing system is used so that the lightly cured, tacky, carbon black reinforced and compounded seaming tape when pressed between layers of cured carbon black reinforced EPDM rubber membranes, the surfaces of which have first been primed, exhibits a peel strength of at least 2.5 pli at 158° F. against said membranes.

The parts by weight ratio of the polyisobutylene to the butyl rubber or its Br or Cl derivatives are from about 40:60 to 60:40. The surface of the cured EPDM membranes where the seaming tape is to be applied may be solvent wiped (with hexane or cyclohexane and the like) prior to the application of the primer coat on the EPDM membranes. The solvent wipe can serve to remove any dusting material applied to the EPDM to prevent adhesion of layers of EPDM to itself during curing (in rolls). A solvent wipe, also, may serve to activate the surface of the EPDM membranes and may increase the peel strength.

While the quinoid curing system is preferred for the seaming tape, sulfur cures using organic accelerators may be used for lightly curing the sealing strip although longer times at higher temperatures may be required to get the desired degree of cure. However, sulfur cures can result in a tape which over a long period of time on a hot roof may be subject to degradation by oxygen and ultraviolet radiation. Such degradation may be partially prevented by using appropriate antioxidants and the like.

The components of the seaming tape may be prepared using common equipment, e.g., a sigma-blade mixer, an extruder and a hot air oven. Solvents are not needed, as would be used in a solvent-casting process. Alternate curing equipment may be used such as a hot-air tunnel or microwave or electron beam curing units which could crosslink the tape on-line. These alternate curing procedures may require minor reformulation of the sealing tape composition to obtain the desired properties.

While this invention has been particularly described with reference to roofing membranes, it will be appreciated that it can be useful with respect to EPDM pond liners, EPDM coated fabrics and so forth.

The following example will serve to illustrate the present invention with more particularity to those skilled in the art.

EXAMPLE

The following compositions were formulated for seaming tapes as shown in Table 1, below:

TABLE 1

| Seaming Tape Formulations | |
|---|---|
| Material | Parts By Weight |
| Butyl 268 | 50 |

TABLE 1-continued

| Seaming Tape Formulations | |
|---|---|
| Material | Parts By Weight |
| VISTANEX LM-MS | 50 |
| SUNPAR 2280 | 40 |
| Carbon Black | 50 |
| Armco 300 (Whiting) | 25 |
| Zinc Oxide | 5 |
| Stearic Acid | 1 |
| p-Quinone Dioxime (QDO) | Variable |
| Lead Dioxide (PbO$_2$) | Variable |

DESCRIPTION OF THE ABOVE MATERIALS

1. Exxon Butyl 268—Isoprene-isobutylene (IIR) copolymer, 1.5% mole unsaturation, ML 1+8 at 212° F. of 46–55.
2. Exxon VISTANEX LM-MS—Polyisobutylene (IM) polymer, Staudinger molecular weight of 8,500–10,000. $\overline{M}v \times 10^{-4}$ of 0.87–1.00.
3. SUNPAR 2280—Sun Oil Co., Paraffinic oil, ASTM D2226 type 104 B.
4. Carbon Black—ASTM Designation N-330, high abrasion furance.
5. Armco 300—Armco general purpose whiting (washed chalk) for caulks, sealants, average particle size 30 microns.
6. P-Quinone Dioxime (QDO)—Synthetic Products Company, product designation PAA-252/A. Because of its toxicity, it is dispersed in CIRCO LIGHT process oil, 62.5% active material.
7. Lead Dioxide (PbO$_2$)—Synthetic Products Company, product designation PAB-5482. because of its toxicity, it is dispersed in CIRCO LIGHT process oil, 75% active material.
8. CIRCO LIGHT—Rubber process, naphthenic oil, ASTM D 2226, Type 103, Sun Oil Co.

| Processing of Above Seaming Tape Formulations Mixer - sigma-blade, 1 qt. working capacity. Mixing Cycle | |
|---|---|
| Time, min. | Material Added |
| 0 | Butyl, ZnO and Stearic acid. |
| 5 | ½ of Black, slowly. |
| ~20 | ½ of Oil, slowly. |
| ~30 | ½ of Black and ½ of Oil, slowly. |
| ~90 | Whiting |
| ~95 | QDO and PbO$_2$. |
| ~100 | Polyisobutylene. |
| ~105 Total | Remove from mixer. |

There was no temperature control system on this mixer, but there was little heat buildup. Final batch temperatures were in the range of 170°–180° F.

ADHESION SAMPLE PREPARATION

EPDM roofing membrane (carbon black reinforced, cured, rubbery random terpolymers of ethylene, propylene and 1,4-hexadiene having about 63–68% ethylene and a relative unsaturation of 0.8–0.9) were used in all of the peel adhesion tests.

Each batch of seaming tape was cold pressed to a nominal thickness of 0.040 inch between silicone release paper. With release paper in place, the tapes were then cured 15 minutes at 212° F. before adhesion samples were made.

A primer (Hughson primer TS-3320-19, 13–16% solids, viscosity of 70–270 cps, in xylene or toluene) was brush applied to the EPDM roofing membrane and allowed to dry for 15 minutes. After removal of release paper, the pressed out seaming tape was sandwiched between two pieces of the primed and dried EPDM membranes.

The composites of EPDM/tape/EPDM were thoroughly stitched together using a handheld, serrated stitcher ¼" wide. Test pieces were cut 1"×5" using a die. Before testing, samples were aged from 2 to 7 days to insure thorough wetting of the EPDM surfaces. This aging was at RT (ca 70° F.).

DISCUSSION

The degree of crosslinking in the above seaming tape formulation is crucial to achieving adequate peel strength. Too much crosslinking takes away the stickiness of the tape resulting in adhesive failures at progressively lower values. Too little crosslinking makes it much like a non-curable tape, having very low peel strength at 158° F.

Attached FIG. 2 shows how peel strengths of the formulations are affected by curative (QDO) level. With low curative, peel strength is low with cohesive failure as shown by FIG. 2. Cohesive failure means that the tape does not separate from the membrane, but fails within itself. After the test, there is tape material still adhered to each piece of membrane. As curative level is increased, peel strength goes through a peak at both RT (ambient or ca 70° F.) and 158° F. Near the peak, adhesive failure begins to occur when cohesive strength of the tape exceeds the adhesive bond strength between the membranes and tape.

According to FIG. 2, QDO level must be chosen to give a compromise between RT and 158° F. peel strength. Peel strength goes through a maximum at a lower QDO level for RT because there is more of a viscous dissipation of peeling energy than at 158° F. At the higher test temperature, strength comes relatively more from elasticity than from viscous dissipation.

The specific formulations used in preparing FIG. 2 are shown in Table 2, below. Included also is the numerical data which is plotted in FIG. 2. Phr in FIG. 2 means parts by weight per 100 parts by weight total of the butyl rubber and the polyisobutylene.

TABLE 2

Formulations And Peel Data For Determining Optimum Curative Level

| Runs | A | B | C | D | E | F | G | H | I | J | K | L | M | N |
|---|---|---|---|---|---|---|---|---|---|---|---|---|---|---|
| Formulation | | | | | | | | | | | | | | |
| Basic Recipe* | 221 | 221 | 221 | 221 | 221 | 221 | 221 | 221 | 221 | 221 | 221 | 221 | 221 | 221 |
| QDO (62.5% Active) | 0 | 0.2 | 0.4 | 0.6 | 0.8 | 1.6 | 0.05 | 0.1 | 0.15 | 0.2 | 0.25 | 0.3 | 0.35 | 0.4 |
| PbO$_2$ (75% Active) | 0 | 0.59 | 1.17 | 1.76 | 2.35 | 4.7 | 0.15 | 0.29 | 0.44 | 0.59 | 0.73 | 0.9 | 1.03 | 1.17 |
| Peel Strength, pli** | | | | | | | | | | | | | | |
| RT (ca 70° F.) | 2.6C | 9C | 3.9A | 3.5A | 2.5A | 2.3A | 3.15C | 3.4C | 7C | 8.2C | 7A | 4A | 4A | 0.4A |

TABLE 2-continued

| | Formulations And Peel Data For Determining Optimum Curative Level | | | | | | | | | | | | | |
|---|---|---|---|---|---|---|---|---|---|---|---|---|---|
| Runs | A | B | C | D | E | F | G | H | I | J | K | L | M | N |
| 158° F. | 0.5C | 1.6C | 1.1A | 0.9A | 0.8A | 0.5A | 0.48C | 0.45C | 0.8C | 1.6C | 2.2C | 2.7A | 2.2A | 2.2A |

*First 7 raw materials of formulation of Table 1, above.
**At a rate of 2 inches per minute cross-head speed.
C - Cohesive failure.
A - Adhesive failure.

We claims:

1. A laminate comprising two cured, carbon black reinforced rubbery EPDM membranes joined together at their primed seams by a seaming tape comprising a lightly cured to a low cross-link density, carbon black reinforced, compounded, tacky and rubbery composition comprising from about 40 to 60 parts by weight of polyisobutylene having an average viscosity molecular weight $\overline{M}v \times 10^{-4}$ of from about 0.60 to 1.40 and from 60 to 40 parts by weight of at least one rubber selected from the group consisting of butyl rubber, chlorinated butyl rubber and brominated butyl rubber having a raw Mooney viscosity (ML 1+8 at 212° F.) of from about 18 to 75 and an unsaturation of from about 0.6 to 2.5 mol %, said tape exhibiting a peel strength of at least about 2.5 pli at about 158° F. against said membranes.

2. A laminate according to claim 1 where the EPDM of said membranes contains ethylene in an amount of from about 62 to 85%, where the non-conjugated diene in the EPDM is 1,4-hexadiene and where the EPDM has a raw Mooney viscosity (ML 1+8 at 250° F.) of from about 14 to 84 and where said rubber is butyl rubber having an unsaturation of about 1.5 mol % and a Mooney viscosity (ML 1+8 at 212° F.) from about 40 to 60.

3. A laminate according to claim 1 where the seams of said EPDM membranes have been solvent washed prior to priming.

4. A laminate according to claim 1 where said EPDM membranes are single ply roofing membranes.

5. A laminate according to claim 1 where a quinoid curing system has been used to lightly cure said rubbery composition.

* * * * *